(No Model.)   7 Sheets—Sheet 1.

W. HIPPERLING.
MACHINE FOR THE MANUFACTURE OF TIN CANS.

No. 488,675.   Patented Dec. 27, 1892.

WITNESSES:
William Goebel
Ed. D. Miller

INVENTOR
Wm. Hipperling
BY Chas. O. Gill
ATTORNEY.

THE NORRIS PETERS CO., PHOTO-LITHO., WASHINGTON, D. C.

(No Model.) 7 Sheets—Sheet 5.

W. HIPPERLING.
MACHINE FOR THE MANUFACTURE OF TIN CANS.

No. 488,675. Patented Dec. 27, 1892.

WITNESSES:
William Goebel.
Ed. D. Miller.

INVENTOR
William Hipperling
BY
Chas. C. Gill
ATTORNEY.

THE NORRIS PETERS CO., PHOTO-LITHO., WASHINGTON, D. C.

(No Model.) 7 Sheets—Sheet 6.
W. HIPPERLING.
MACHINE FOR THE MANUFACTURE OF TIN CANS.
No. 488,675. Patented Dec. 27, 1892.
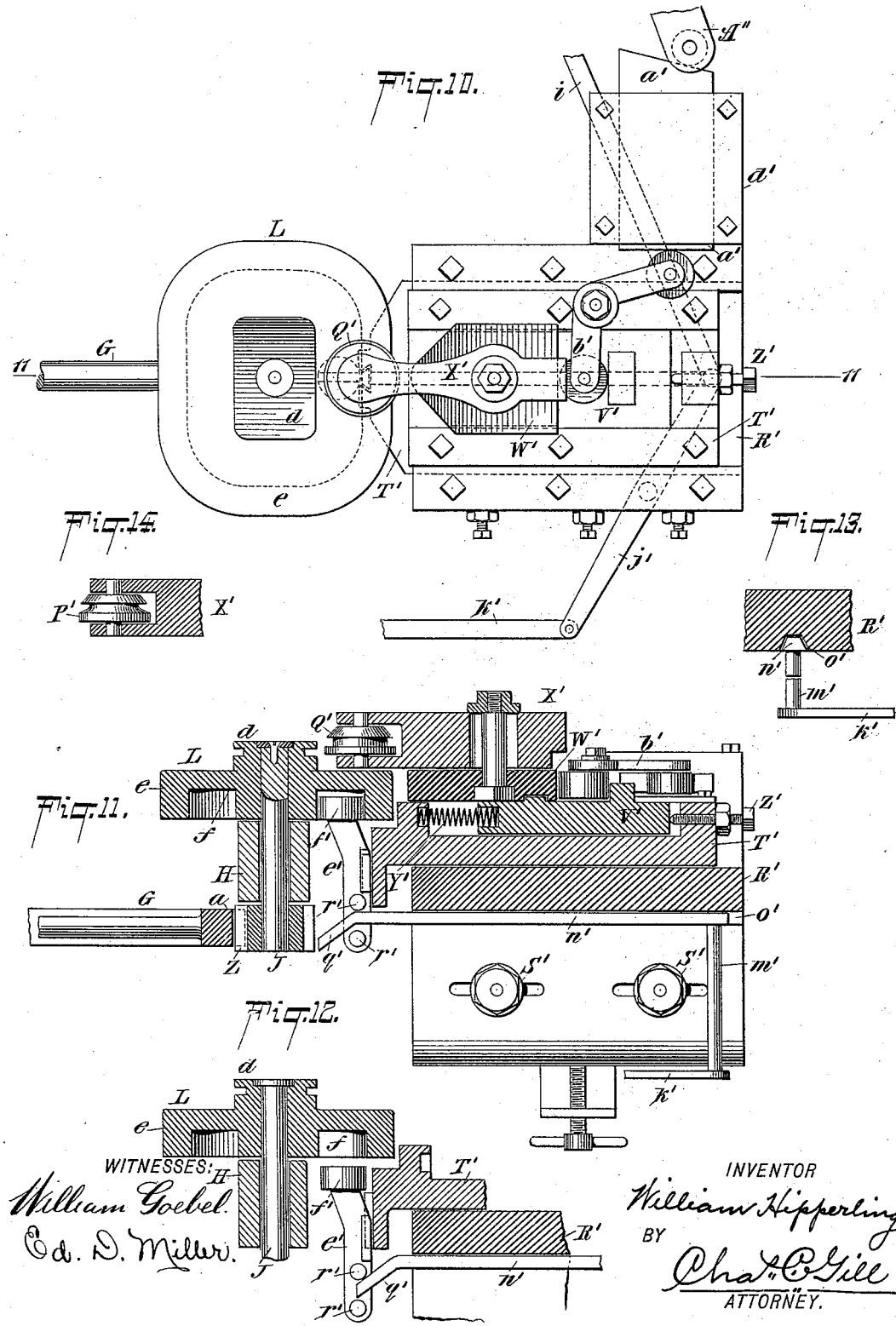

(No Model.) 7 Sheets—Sheet 7.
W. HIPPERLING.
MACHINE FOR THE MANUFACTURE OF TIN CANS.
No. 488,675. Patented Dec. 27, 1892.
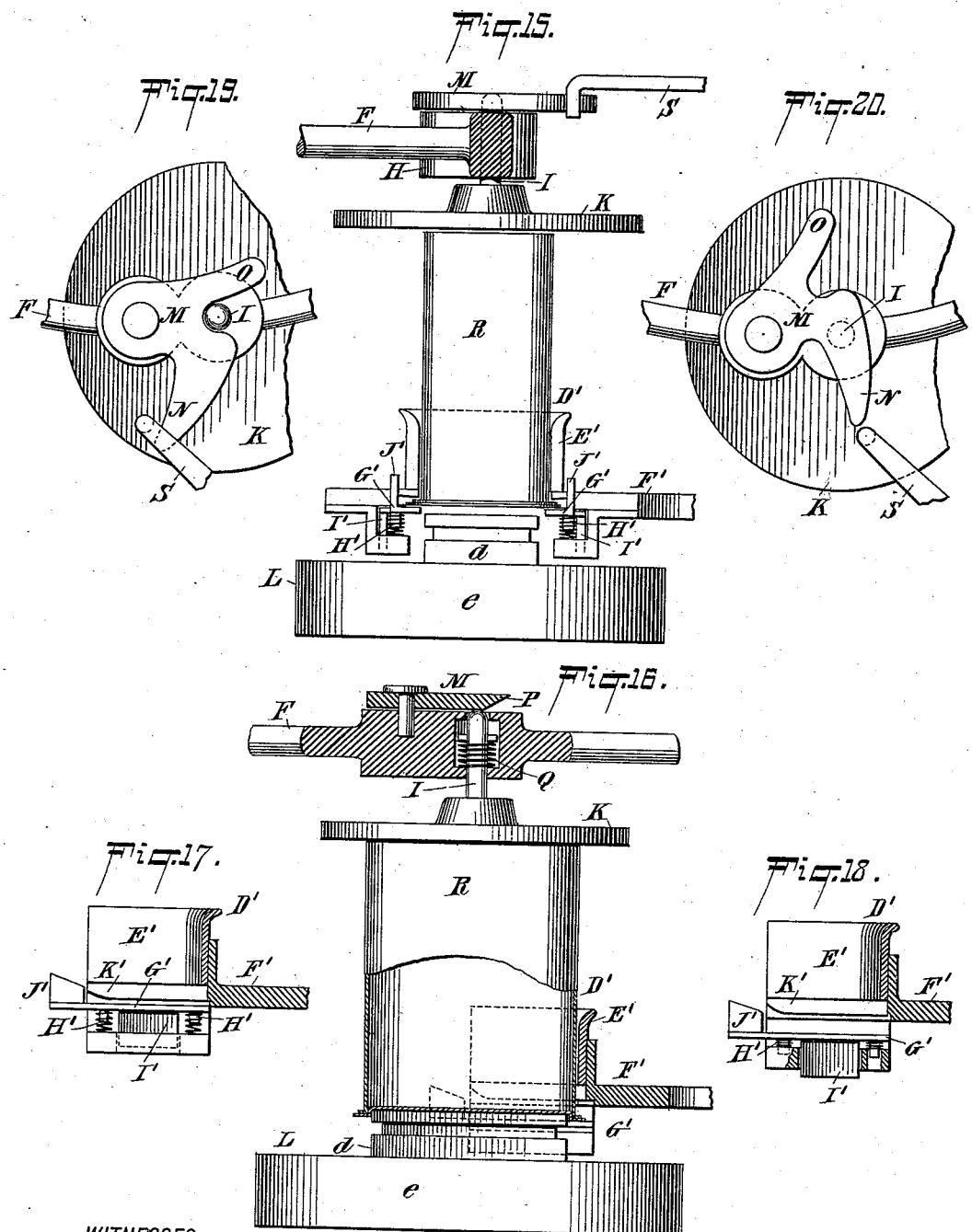
WITNESSES:
William Goebel.
Ed. D. Miller.
INVENTOR
William Hipperling
BY
Chas. O. Gill
ATTORNEY.

UNITED STATES PATENT OFFICE.

WILLIAM HIPPERLING, OF NEW YORK, N. Y., ASSIGNOR TO STEPHEN A. GINNA, OF PLAINFIELD, NEW JERSEY, AND RICHARD A. DONALDSON, OF BROOKLYN, NEW YORK.

MACHINE FOR THE MANUFACTURE OF TIN CANS.

SPECIFICATION forming part of Letters Patent No. 488,675, dated December 27, 1892.

Application filed June 3, 1892. Serial No. 435,365. (No model.)

*To all whom it may concern:*

Be it known that I, WILLIAM HIPPERLING, a citizen of the United States, and a resident of New York, in the county of New York and State of New York, have invented certain new and useful Improvements in Machines for the Manufacture of Tin Cans, of which the following is a specification.

The invention relates to improvements in machines for the manufacture of tin cans, and particularly to machines for double-seaming the ends to the body of the cans, whether the latter be circular or angular in cross-section.

The invention comprises an intermittently movable frame carrying clamps which grasp the cans and move them to and rotate them against the seaming rollers, the latter being supported on chucks controlled by cams conforming in outline with the cans in cross-section and centered with the clamps which carry said cans.

The invention further comprises special mechanism and combinations of parts connected with the above mentioned frame, clamps and seaming rollers for giving effect and imparting the proper movements thereto, as hereinafter more fully described. The object of the invention is to produce a can seaming machine of great capacity and capable of automatically clamping the cans at the points at which they are fed to the machine and moving them by intermittent stages to the seaming rollers which are automatically actuated and their pressure against the flanges on the can maintained by connections from the driving shaft.

The nature and objects of the invention will be more fully understood from the detailed description hereinafter presented, reference being had to the accompanying drawings, in which:—

Figure 1:
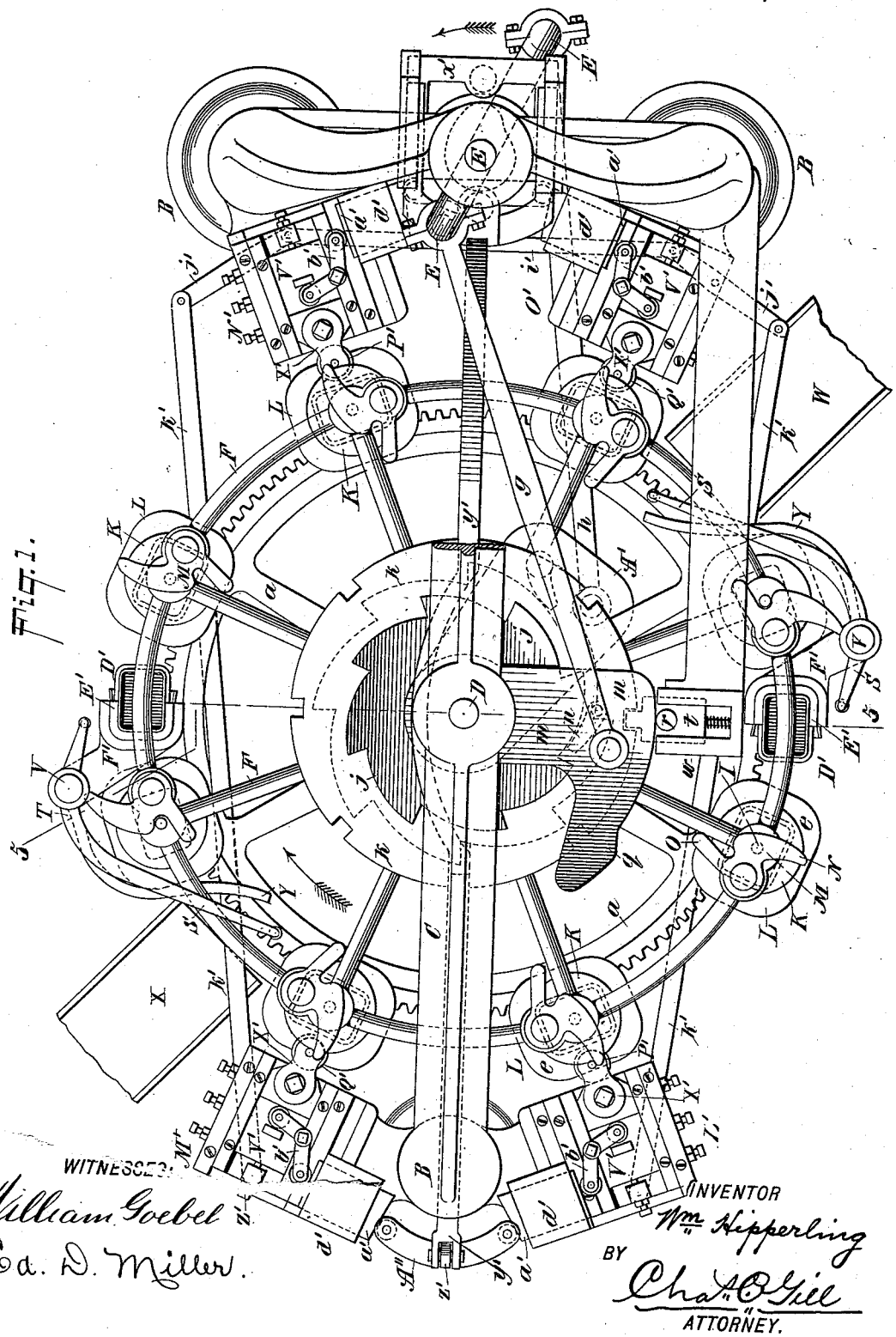
Figure 2:
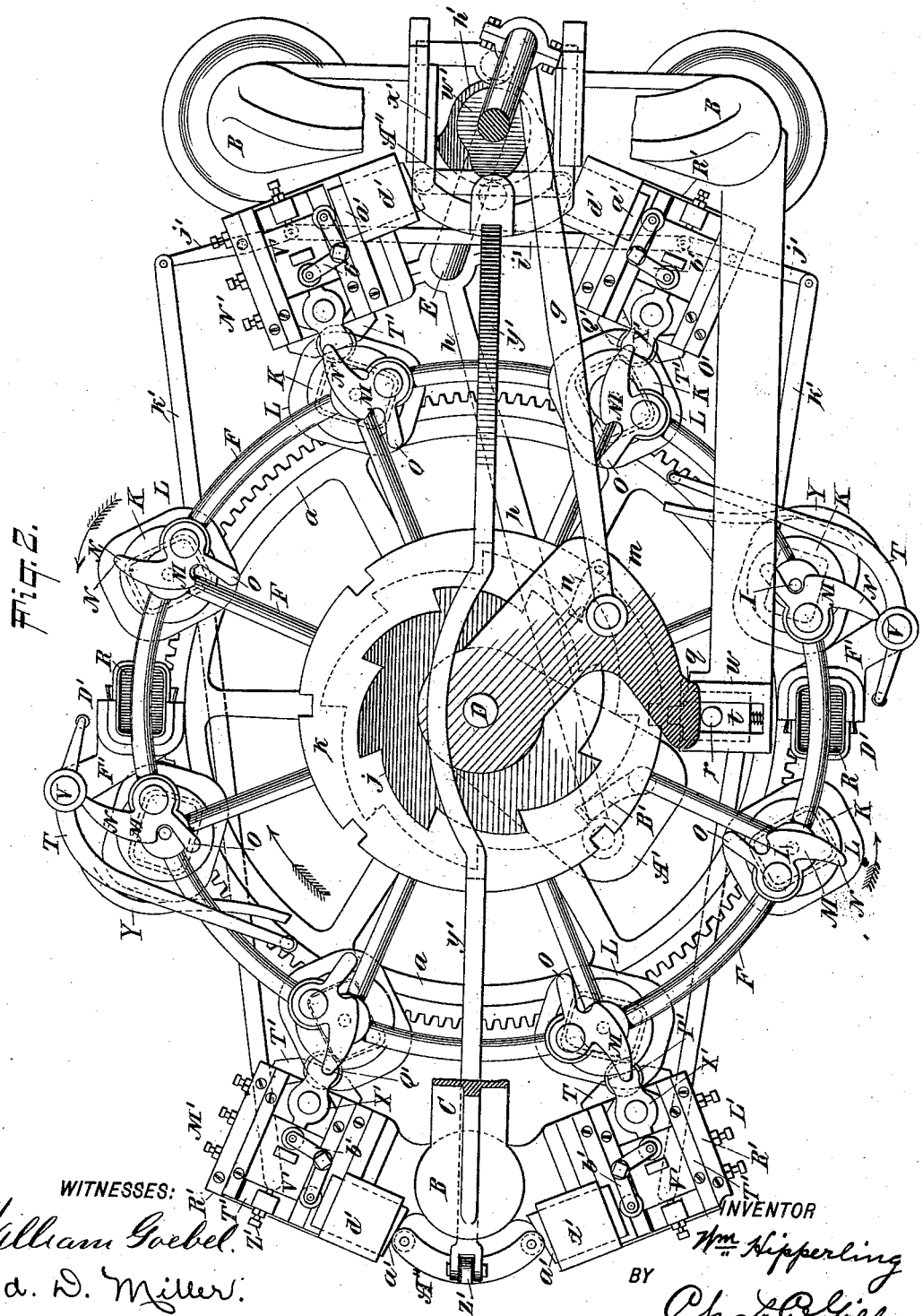
Figure 3:
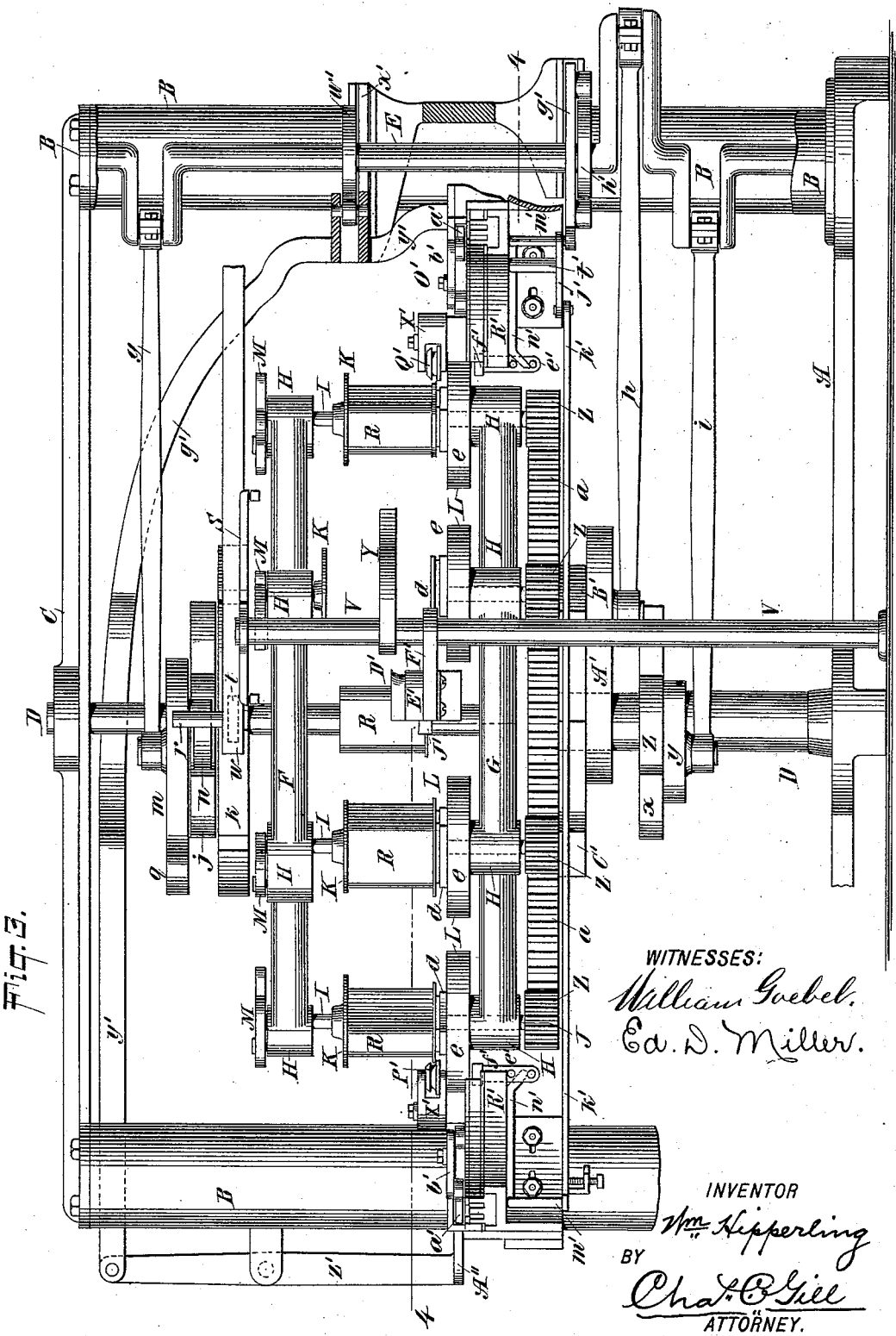
Figure 4:
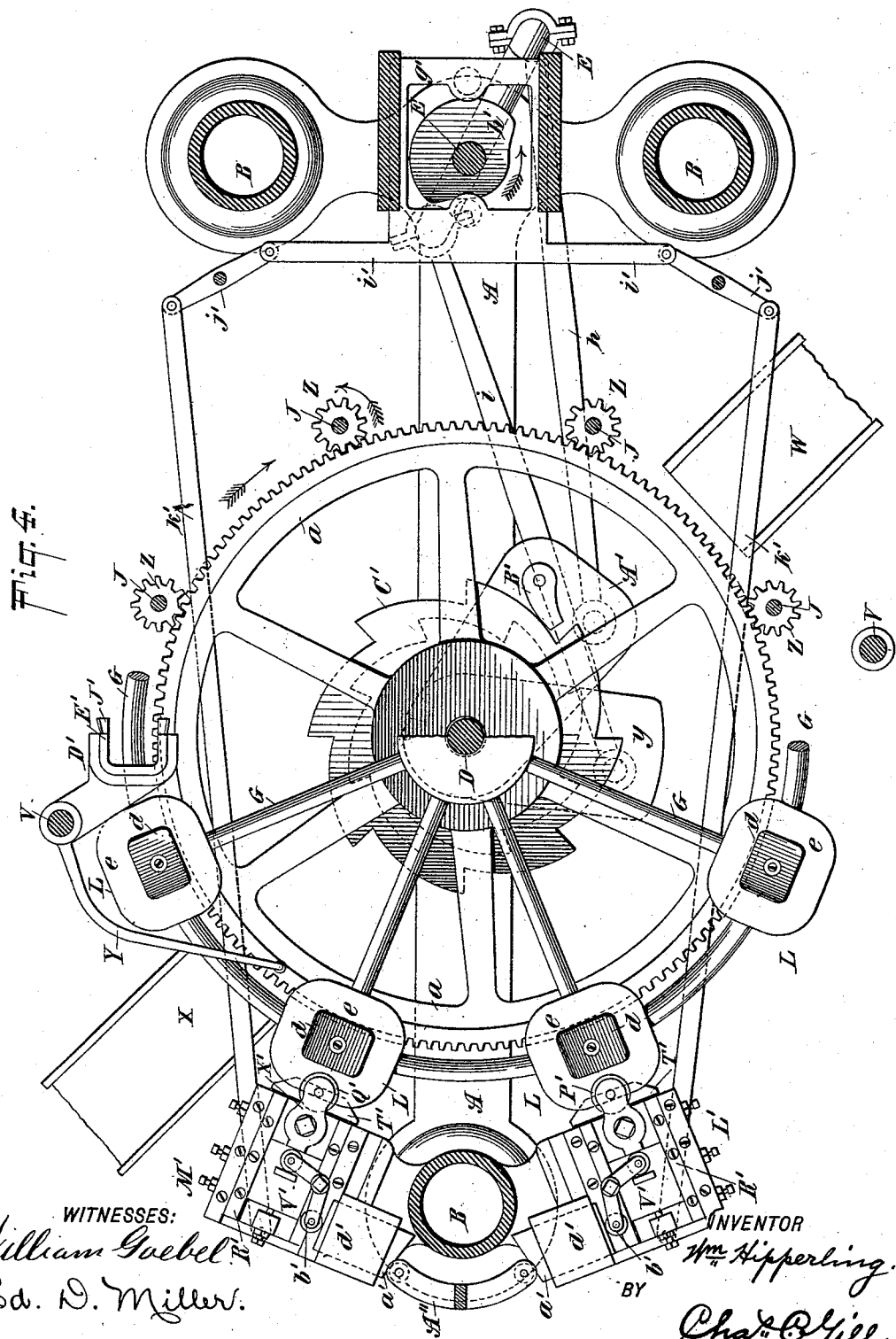
Figure 5:
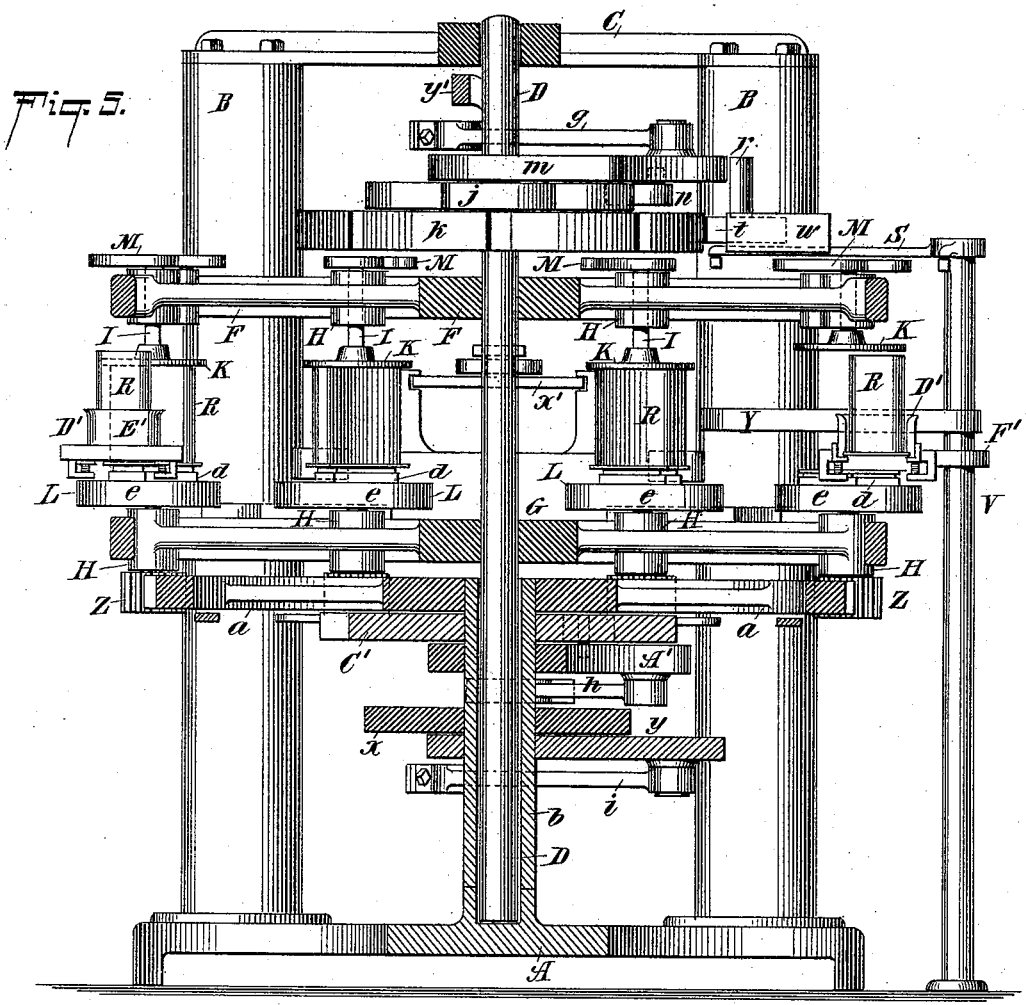
Figure 6:
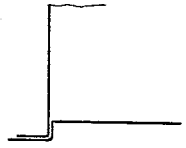
Figure 7:
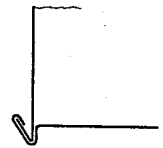
Figure 8:
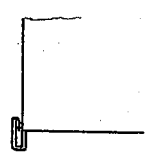
Figure 9:
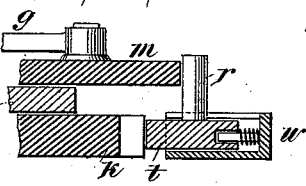

Figure 1 is a top view of a machine constructed in accordance with the invention, a portion of the top frame thereof being broken away for clearness of illustration; Fig. 2 is a like view of same, the operative parts of the machine being however shown in a different position with relation to each other; Fig. 3 is a side elevation of same, partly in section and a portion of the supporting frame of the machine being broken away; Fig. 4 is a horizontal section of same on the dotted line 4—4 of Fig. 3; Fig. 5 is a vertical section of same on the dotted line 5—5 of Fig. 1; Fig. 6 is a diagram showing the form and relation of the can body and end prior to the seaming operations; Fig. 7 a like view of same after the first operation of seaming; Fig. 8 a like view of same after the second and final seaming operation; Fig. 9 is a detached vertical section through a portion of the operative mechanism connected with the main frame carrying shaft, this view referring particularly to the spring acting dog which engages the notched plate on the said shaft to lock the latter at the end of each movement of said frame; Fig. 10 is an enlarged detached top view of one of the platens for supporting a can and the mechanism supporting and actuating one of the seaming rollers and its connections; Fig. 11 is a vertical section of same on the dotted line 11—11 of Fig. 10, the parts being shown in position for operation; Fig. 12 is a like section of a portion of same, the seaming roller connections being separated from their controlling cam, as shown, and in a position of rest; Fig. 13 is a detached vertical transverse section through a part of the bed plate for the seaming roller devices and illustrating the groove in the lower side thereof and the end of the reciprocating rod inclosed therein and hereinafter referred to; Fig. 14 is a detached side elevation of the seaming roller which performs the first step in the operation of double seaming, the chuck for this roller being shown in section; Fig. 15 is an end elevation of the receiver into which the cans are placed as they are fed to the machine in position to be clamped on the platen which is centered on the controlling and actuating revolving cam shown; Fig. 16 is a central vertical longitudinal section of said receiver and can, with the latch locking the clamp down upon the can and holding the latter on said platen in position to be carried onward to the seaming rollers; Fig. 17 is a detached central vertical longitudinal section of said receiver, showing the position of its parts prior to the can being clamped downward on its platen; Fig. 18 is a like view of same, showing the position of its parts after the can has been clamped downward on its platen; Fig. 19 is a detached top view, partly broken away, of the clamp for holding down the can to be seamed, with the pivoted latch for locking said clamp, said latch being shown in its initial position free of the spindle of said clamp; and Fig. 20 is a like view of same, the latch being shown in its given position over the spindle of the clamp and locking the latter upon the can.

In the drawings the general frame of the machine is shown as composed of the base A, standards B, and top frame C, but the invention is not confined to a supporting frame of any special form or construction.

Between the base A and top frame C are journaled the shafts D, E, the latter being the shaft to which power may be applied, and the former the shaft which supports the revoluble can clamping and carrying frame composed of the upper and lower sections or wheel-frames F, G. The frames F, G, correspond with each other and are keyed on the shaft D, and said frames at equi-distant points along their periphery are provided with hubs H for the spindles I, J, of the clamps K, L, which grasp the cans and move them to the seaming rollers.

Upon the hubs H of the upper wheel frame F are pivotally mounted the latches M having the arms N, O, and at its under surface the inclined surface P, shown in Fig. 16; and the purpose of the latches M is to depress the spindles I and clamp plates K when moved over said spindles to the position shown in Figs. 1, 16 and 20, and to permit the elevation of said spindles I and plates K when moved to their initial position shown in Figs. 15 and 19. Within the hubs H of the upper frame F are the upwardly acting coiled springs Q (see Fig. 16) which encompass the spindles I, and retain said spindles and the clamp plates K in their upward position, except at such times as the latches M may be moved to depress them upon the can body R. The inclined surface P of the latches M rides over the upper end of the spindles I when said latches are moved to the position shown in Figs. 16 and 20, and the upper ends of said spindles are rounded to facilitate their rapid revolution with the clamp plates K while the latter are depressed upon the can and the can is being subjected to the action of the seaming rollers. During the revolution of the wheel frames F, G, the latches M are operated or turned on their pivot to clamp or release the cans R by their arms N, O, coming into contact with the extremities of the rigid arms S, T, mounted on standards V at opposite sides of the machine. As the clamp plates K, L, arrive in position to receive the cans R the arms N of the latches M move against the shorter ends of the arms S, T, and thus turn the latches M over the spindles I, thereby depressing the plates K upon and clamping the cans; and as the wheel frames F, G, move onward carrying the cans against the seaming rollers and then bring them to the discharge chutes W, X, the arms O of said latches M come into contact with the longer ends of said arms S, T, and thereby the latches are moved from over the spindles I to their initial position and the springs Q are permitted to elevate the clamp plates K free of the cans R, which immediately thereafter will be carried against the curved arms Y also secured to the standards V and be by them caused to leave the lower clamp plates L and roll off down the inclined chutes W, X.

The clamp plates L are secured to the upper ends of the spindles J which carry at their lower ends the pinions Z which are in constant engagement with the gear wheel $a$, the latter being keyed upon the sleeve $b$ encompassing the lower portion of the shaft D and revoluble independently thereof. The clamp plates L consist of the platen $d$ and cam plate $e$, see Figs. 10, 11, 15 and 16, the upper end of the former being adapted to enter the usual recess in the head of the can, as shown in Fig. 16, while the cam plate $e$ contains the groove $f$, shown by dotted lines in Fig. 10, and by full lines in Figs. 11 and 12, which groove conforms to the outline of the can R in cross section. The groove $f$ of the cam plate $e$ shown, is adapted for a can R having the oblong outline indicated by the shape of the platen $d$, but said groove $f$ will vary with and indicate the pattern of the cans whether the latter be square or polygonal in cross-section. The cam groove $f$ performs no function except when the clamps are in direct relation with the seaming tools, and its operation when in such relation will be explained hereinafter. It may be stated however that the clamp plates L are removable from the spindles J and will be changed to meet the different shapes and sizes of cans to be treated.

When the clamps K are depressed by the latches M they lock the cans R down upon the platens $d$, and when the clamps K are elevated they free the cans and leave them in condition to be turned from the platens $d$ by their contact with the arms Y.

The wheel frames F, G, have an intermittent motion with the shaft D, and the gear wheel $a$ has a like and simultaneous movement with the sleeve $b$ and also a rapid revolving motion with the said sleeve after the wheel frames F, G, have come to a stop, with the cans in position to be acted on by the seaming rollers. The intermittent motion of the wheel frames F, G, with their clamps K, L, pinions Z, and gear wheel $a$, is simply to carry the cans to and then beyond the seaming rollers, and during this intermittent motion the cans will not be revolved since the gear wheel $a$ travels with the pinions Z and frames F, G, but at the end of each intermittent motion of the frames F, G, and gear wheel $a$, the latter will have a further revolving motion imparted to it and being in engagement with the pinions Z will at such time cause the same, with the spindles J, clamps K, L, and cans R, to have a rapid revolution, the cans being held in position to have their flanges acted on by the seaming rollers.

The proper movements are imparted to the wheel frames F, G, and gear wheel $a$ from the crank shaft E through the rods lettered $g$, $h$, $i$, respectively and intermediate ratchet mechanism between the inner ends of said rods and the shaft D and sleeve $b$. The rods $g$, $i$, impart the corresponding intermittent motion to the wheel frames F, G, and gear wheel $a$, and the rod $h$ insures the independent revolving motion to the gear wheel $a$, pinions Z and connecting devices. As may be seen in Figs. 1 and 3 the shaft D above the wheel frames F, G, is provided with the ratchet wheel $j$, notched locking plate $k$, and loosely mounted shoe $m$ carrying the pawl $n$ and having the cam edge $q$, which acts upon the rod $r$ extending upward from the dog $t$. The inner end of the rod $g$ is pivotally secured to the shoe $m$ and during the revolution of the shaft E oscillates said shoe, with the effect of imparting through the pawl $n$ and ratchet $j$ an intermittent revolving motion to the shaft D and wheel frames F, G. The plate $k$ and dog $t$ are provided to lock the shaft D and wheel frames F, G, at the end of each of their intermittent motions. The dog $t$ moves in guides $w$ and has a spring action toward the plate $k$, and its engagement with said plate is regulated by the cam edge $q$ on the shoe $m$ acting through the rod $r$ as shown in Figs. 1 and 2.

Below the gear wheel $a$ the sleeve $b$ encompassing the shaft D is provided with the ratchet wheel $x$ and the loose shoe $y$ carrying the pawl $z$ and receiving the inner end of the rod $i$, which simultaneously with the movement of the rod $g$, oscillates the shoe $y$ and imparts from the shaft E an intermittent motion to the ratchet wheel $x$, sleeve $b$ and gear wheel $a$. The rods $g$, $i$, act together, and hence the gear wheel $a$ will move with the wheel frames F, G, without rotating the pinions Z and cans R. There is no locking plate, similar to that lettered $k$, on the sleeve $b$, since at the end of the intermittent motion imparted from the rods $g$, $i$, the sleeve $b$ and gear wheel $a$ have a further and more rapid revolution imparted to them from the shaft E through the rod $h$, oscillating shoe A', pawl B' and ratchet wheel C', and during this revolution, while the frames F, G, are at rest, the action of the gear wheel $a$ and pinions Z is to revolve the cans R while in contact with the seaming rollers.

The cans R are fed to the machine at opposite sides by being placed one after another in the receivers D', shown more clearly in Figs. 15 to 18 inclusive. These receivers D' are supported from the rods V in position to permit the clamp plates K, L, to pass over them and withdraw the cans from them during the revolution of the wheel frames F, G, as indicated in Figs. 15 and 16. The receivers D' have a three-sided vertical frame E' open top and bottom and secured to a supporting frame F'; and below the opposite sides of the frame E' are the narrow tables G' having a spring tension upward by reason of the springs H' and provided with the vertical guides I', which direct said tables in their vertical reciprocating movement. The outer ends of the tables G' are provided with the vertical extensions J' the better to hold and direct the can bodies and their heads to the receivers D', and the entrance below the frame E' is tapered, as at K' for the purpose of directing the edges of the can heads to their position on the tables G'. In the employment of the receivers D' the cans R with their heads in position are placed within the frame E', with the flanges to be seamed below said frame E' and upon the tables G', and in this position they are allowed to remain until during the movement of the wheel frames F, G, the clamps K, L, pass to said receivers, as shown in Fig. 15, and the clamps K are depressed upon the cans, as shown in Fig. 16, by reason of the latches M meeting the arms S, as above described, at which time the pressure of said clamps K will depress the cans to and firmly hold them on the platens $d$ of the clamps L, with the result that as the wheel frames F, G, continue to move onward the clamps K, L, will withdraw the cans from the open side of the frame E' and carry them to the seaming rollers, leaving the receivers D' empty for the reception of further cans. Upon the depression of the cans R by the clamps K the springs H' of the receivers D' are compressed to permit the can to reach the platens $d$, as indicated in Fig. 18, and upon the withdrawal of the cans by the clamps the springs H' return the tables G' to their upward position shown in Figs. 15 and 17.

In the drawings, Fig. 1, the machine presented is of double capacity with seaming devices at each end, and hence two receivers D' are employed one at each side and opening in opposite directions toward the seaming rollers.

In the foregoing description the construction and operation of all of the parts of the machine, with the exception of the seaming devices, have been explained, and these seaming devices in all important particulars are shown, described and claimed in an application for Letters Patent filed by me on the 29th day of March 1892, Serial No. 426,886. In the present application, however, are shown special features of construction adapting the seaming mechanism to a machine of the character now sought to be protected.

The seaming mechanism is composed of four sets, lettered respectively L', M', N', O', two being located at each end of the machine and being sufficient for the complete double seaming of the cans. The sets of mechanism L', M', N', O', are exact duplicates of each other with the exception that the seaming roller P' in the sets L', N', has a groove adapting it for the first operation of double seaming and the seaming roller Q' in the sets M', O', has a flat groove adapting it for the second and final operation of double seaming, and hence in Figs. 10, 11 and 12 one set only of said mechanism is shown on an enlarged scale. Each set of the seaming mechanism has the bed R' secured to the supporting frame and adjustable laterally toward or from the clamps L by means of the screws S', and upon the bed R' is placed the reciprocating slide T' which carries the plates V', W', and chuck X', the latter having at its end the seaming roller. Between the inner ends of the slide T' and plate V' is the interposed spring Y', whose tension is to keep the plate V' and chuck X' outward from the cam $f$ in the clamp L, and this tension must be overcome by devices presently to be described when the seaming roller carried by said chuck is to perform the seaming operation. The extreme outward position of the plate V' and chuck X' may be regulated by a set screw Z'. The plates V', W', and chuck X' are connected together and have a simultaneous motion, and are caused to approach the cam $f$ by the action of the slide $a'$ and bell crank lever $b'$, the latter being intermediate the slide $a'$ and the outer end of the plate W', as shown in Fig. 10. When the slide $a'$ is moved in its guide $d'$ against the adjacent arm of the bell crank lever $b'$ the other arm of said lever will move the plates V', W', and chuck X' toward the platen $d$ and bring the seaming roller into direct contact with the flanges on the can R, which at such time will be in a condition of rapid revolution with the clamps K, L. The chuck X' will be caused to reciprocate under the action of the seaming roller following the shape of square or polygonal cans R, and during this movement, the slide T' also reciprocating, the back pressure on the slide $a'$ will not be increased, since the roller in the end of the bell crank lever will simply ride back and forth on the end of said slide $a'$. The mechanism for moving the slide $a'$ will be referred to hereinafter. The main slide T' receives its reciprocating motion from the cam $f$ in the clamp L through the medium of the vertical arm $e'$ dovetailed to the end of said slide and carrying at its upper end the roller $f'$ entering the said cam $f$. The arm $e'$ is adjustable vertically, and hence the roller $f'$ may be moved upward into the cam $f$ or be withdrawn therefrom at will. When the roller $f'$ is within the cam $f$, the revolution of the latter will through the arm $e'$ reciprocate the slide T' and this only occurs during the actual operation of seaming when the clamps K, L, have brought a can into line with the chuck X'. The entrance of the roller $f'$ to the cam $f$ is simultaneous with the inward movement of the slide $a'$ and the outward thrust of the chuck X'.

The four sets of seaming mechanism L', M', N', O', operate in unison, and hence mechanism is provided to effect the simultaneous elevation of the rollers $f'$ of all the sets into the cams $f$ above them, and the simultaneous outward movement of all the chucks X' to bring their seaming rollers against the flanges of the cans in line with them. The mechanism for elevating the rollers $f'$ into the cams $f$ is shown more clearly in Figs. 2, 3 and 4, and consists of the reciprocating frame $g'$ inclosing the cam $h'$ on the shaft E, see Fig. 4, and having connected with its arms $i'$ the centrally pivoted levers $j'$ to which are pivotally secured the connecting rods $k'$, whose outer or left hand ends are by means of rods $m'$, see Figs. 3, 11, 12 and 13, connected with the slides $n'$ reciprocating in grooves $o'$ formed in the lower surface of the bed plates R' of the seaming mechanism L', M'. The outer ends of the slides $n'$, see Figs. 11 and 12, are bent to form cams $q'$ extending between the rollers $r'$ of the arms $e'$ carrying the rollers $f'$. When the slides $n'$ are moved inward the cams $q'$ will act against the upper rollers $r'$ and elevate the arms $e'$ sufficiently to cause the rollers $f'$ to enter the cams $f$, as shown in Fig. 11, and when the slides $n'$ are moved outward the lower surface of the cams $q'$ will act against the lower rollers $r'$ and withdraw the rollers $f'$ from the cams $f$, as shown in Fig. 12. The rocking levers $j'$ are supported on dependent arms $t'$, see Fig. 3, and the meeting ends of the levers $j'$ and arms $i'$ connect with the rods $m'$ of the slides $n'$ for the sets N', O', of seaming mechanism for the right hand end of the machine, as indicated by dotted lines in Figs. 1 and 2 and by full lines in Fig. 3. The cam $h'$ imparts a reciprocating movement to the frame $g'$ and this through its arms $i'$ communicates the desired motion to the rods $m'$, slides $n'$, arms $e'$ and rollers $f'$, for the sets N', O', of seaming mechanism, and the reciprocating movement of the frame $g'$ acting through the levers $j'$ and connecting rods $k'$ also communicates simultaneously the desired motion to the rods $m'$, slides $n'$, arms $e'$ and rollers $f'$ of the sets L', M', of seaming mechanism at the left hand end of the machine, and hence from the one cam $h'$ the four sets of seaming mechanism will be put into connection for simultaneous operation. The four slides $a'$ are moved inward to act on the bell crank levers $b'$ and chucks X', from the shaft E through the medium of the cam $w'$, the frame $x'$ engaging said cam, the rod $y'$ connected with said frame, the rocking lever $z'$ connected with said rod, and the short transverse arms A'', one of the latter being connected with the lower end of the lever $z'$ and located between the sets of mechanism L', M', in position to engage both slides $a'$ thereof as shown in Figs. 1 and 2, while the other arm A'' is secured to the lower left hand end of the rod $y'$ and located between the sets of mechanism N', O', in position to engage both slides $a'$ thereof, thus the reciprocating motion of the frame $x'$ acting through the connections $y'$, $z'$ cause the arms A'' to move against or recede from the outer ends of the slides $a'$, and cause said slides to be moved inward against the bell crank levers $b'$, as shown in Fig. 2, or permitted to return to their outer position, shown in Fig. 1, through the influence of the springs Y'. The outer ends of the arms A'' are provided with small rollers and the adjoining ends of the slides $a'$ are inclined to facilitate the action of said arms. The frames $g', x'$ engaging the cams $h', w'$, are also provided with the usual contact rollers, as shown. The effect of the inward movement of the slides $a'$ is to bring the seaming rollers into contact with the cans in line with the chucks X' and to maintain the pressure of the rollers on the cans until the cam $w'$ has turned sufficiently to permit the arms A'' to recede from the slides $a'$. The pressure on the slides $a'$ maintains the seaming rollers while engaged in their work and the form of the revolving cam $f'$ holding the can enables the seaming rollers to double seam cans which are polygonal in cross section.

Power may be applied to the shaft E by any of the well known appliances customarily employed in connection with seaming machines. The revolution of the shaft E will through the rods $g, h, i,$ and cams $h', w'$, set the entire mechanism of the machine in appropriate motion, and the attendants will simply feed the cans with their heads to the receivers D' from which they will be withdrawn by the clamps K, L, as above described and be carried to the seaming mechanism. The cans taken from one receiver D' will be carried by the clamps K, L, first to the seaming mechanism L' for the first operation, indicated in Fig. 7, and then to the seaming mechanism M' for the second operation, shown in Fig. 8, after which they are moved on to the discharge chute X and turned into the same by the arm Y; while at the same time the cans taken from the other receiver D' will be moved to the set of seaming mechanism N', for the first seaming operation, then to the seaming mechanism O' for the final seaming operation, and finally to the chute W into which they are discharged by the freeing of the clamp K and the contact of the arm Y, as hereinbefore explained. The receivers D' should be kept constantly supplied with the cans in order to work the machines to its full capacity. At the end of each intermittent motion of the wheel frames F, G, the rollers $f'$ are caused to engage the cams $f$, and the arms A'' engage the slides $a'$, and hence while the gear wheel $a$ is having its independent revolution and revolving the clamps K, L, and cans R, the seaming devices will be in position and condition to effectually perform their duty.

I do not limit the invention to the use of the four sets of seaming mechanism, nor to the details of construction and arrangement. Neither do I limit the invention to the direct connecting together of the platen $d$ and cam plate $e$, since if said parts were separated but kept in line with each other the result would be unaffected.

While special rollers for seaming have been shown and described, the invention in its broader scope is not confined to any special form of rollers for seaming or crimping the heads to the body of tin cans; nor is the invention confined to the special connections shown intermediate the seaming rollers and the rollers engaging the cams $e$.

What I claim as my invention and desire to secure by Letters Patent, is:

1. The traveling frame, the series of revoluble clamps carried thereby, means for retaining said clamps against the opposite ends of the cans during the travel of the frame, and the series of revoluble platens and cams carried by said frame and conforming in outline with that of the cans in cross-section, combined with the independent chuck holding the seaming roller in line with said cans, means for applying pressure to said chuck, the roller engaging said cams in succession, and intermediate connections between said rollers; substantially as and for the purposes set forth.

2. The traveling frame, the series of revoluble clamps carried thereby, means for retaining the said clamps against the opposite ends of the cans during the travel of the frame, and the series of revoluble platens and cams carried by said frame and conforming in outline with that of the cans in cross-section, combined with the independent chucks holding the different kinds of seaming rollers in line with said cans, means for applying pressure to said chucks, the cam rollers engaging said cams in succession, and intermediate connections between said chucks and said cam rollers; substantially as and for the purposes set forth.

3. The traveling frame, and the series of revoluble clamps, platens and cams carried by said frame, said platens and cams conforming in outline with the cans in cross-section, combined with the independent seaming roller having a spring tension outward, the roller to engage said cams in succession, mechanism substantially as described for engaging and disengaging said roller and cams, intermediate connections between said rollers and means for moving said seaming roller against the cans in succession; substantially as and for the purposes set forth.

4. The traveling frames, the series of revoluble clamps carried by said frame, and the platens and cams conforming in outline with that of the cans in cross section, combined with the springs imparting an outward tension to the movable set of said clamps, the pivoted latches for closing the clamps upon the cans, the chuck holding the seaming roller in line with said cans, means for applying pressure to the chuck, and intermediate connections between said chuck and said cam; substantially as set forth.

5. The revoluble frames, the clamps for grasping the cans, the platens and cams, mechanism for imparting to said frame an intermittent movement, the pinions connected with the spindles of said clamps, the gear wheel engaging said pinions, mechanism for imparting to said gear wheel an intermittent movement simultaneously with the movement of said revoluble frame, and mechanism for imparting to said gear wheel an independent revoluble movement, combined with the chuck holding the seaming roller in line with said cam, means for applying pressure to the chuck, and intermediate connections between said chuck and said cam; substantially as set forth.

6. The revoluble frames mounted upon the shaft, the clamps carried by said frame, for grasping the cans, the platens and cams and mechanism for imparting to said frame an intermittent movement, combined with the pinions connected with the spindles of said clamps, the gear wheel mounted on a sleeve encompassing said shaft and engaging said pinions, mechanism for imparting to said sleeve and gear wheel an intermittent motion corresponding with that of the clamp carrying frame, mechanism for imparting to said sleeve and gear wheel an independent revolving motion, the chuck holding the seaming roller in line with said cans, means for applying pressure to the chuck, and intermediate connections with said chuck and said cams; substantially as set forth.

7. The traveling frame, the clamps carried by said frame and arranged to grasp the cans, combined with the open receiver for the cans and heads, the narrow tables at opposite edges thereof, the springs for giving said tables an upward tension, and seaming rollers in the path of said traveling frame; substantially as set forth.

8. The traveling frame, the clamps carried thereby for grasping the cans, and the platens and cams conforming in outline with that of the cans in cross-section, combined with the chucks at opposite ends of said frame, seaming rollers for the different operations of double seaming held by said chucks, intermediate connections between said chucks and said cams, means for simultaneously applying pressure to all of said chucks from the driving shaft, and means for causing said intermediate connections to simultaneously engage said cams; substantially as set forth.

9. The revoluble frame, the clamps for grasping the cans, mechanism for imparting to said frame an intermittent motion, the pinions connected with the spindles of said clamps, the gear wheel engaging said pinions, mechanism for imparting to said gear wheel an intermittent motion corresponding with that of the revoluble frame, and mechanism for imparting to said gear wheel an independent revoluble movement, combined with seaming rollers in the path of said cans; substantially as set forth.

Signed at New York, in the county of New York and State of New York, this 20th day of May, A. D. 1892.

WILLIAM HIPPERLING.

Witnesses:
 CHAS. C. GILL,
 ED. D. MILLER.